United States Patent
Rodewald

(10) Patent No.: US 7,703,485 B2
(45) Date of Patent: Apr. 27, 2010

(54) SELF-SEALING APPARATUS FOR CHEMICAL REACTION VESSEL

(75) Inventor: Stephan Rodewald, Canal Fulton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 190 days.

(21) Appl. No.: 12/117,796

(22) Filed: May 9, 2008

(65) Prior Publication Data
US 2008/0210689 A1     Sep. 4, 2008

Related U.S. Application Data

(63) Continuation of application No. 10/899,995, filed on Jul. 27, 2004, now abandoned.

(51) Int. Cl.
*B65B 1/04* (2006.01)
(52) U.S. Cl. ............ 141/329; 141/330; 141/98
(58) Field of Classification Search ........ 141/329, 141/330, 98, 154; 222/80–83, 89
See application file for complete search history.

(56) References Cited

U.S. PATENT DOCUMENTS

| | | | |
|---|---|---|---|
| 2,056,322 A | 10/1936 | Hoppe | 251/129.14 |
| 3,893,651 A | 7/1975 | Uecker | 251/82 |
| 4,121,741 A | 10/1978 | Adamson | 222/181.2 |
| 4,133,354 A | 1/1979 | Lerner et al. | 141/18 |
| 4,261,485 A | 4/1981 | Borg | 222/500 |
| 4,764,046 A | 8/1988 | Kitamura et al. | 401/270 |
| 5,586,589 A | 12/1996 | Voelker | 141/349 |
| 6,055,979 A | 5/2000 | Fuchs | 128/203.15 |
| 6,427,972 B1 | 8/2002 | Kirschner | 251/129.15 |
| 6,568,424 B1 | 5/2003 | Galad et al. | 137/523 |
| 2007/0183936 A1 * | 8/2007 | Newsam et al. | 422/102 |

* cited by examiner

*Primary Examiner*—Khoa D Huynh
(74) *Attorney, Agent, or Firm*—Alvin T. Rockhill

(57) ABSTRACT

According to an aspect of the invention, an apparatus for self-sealing of a reaction vessel, such that the reaction vessel may be repeatedly accessed by a fluid transfer mechanism and subsequently self-sealed, is detailed. The reaction vessel has an access opening, and the apparatus comprises a cap, a ball which is comprised of a magnetizable material (such as a ferrous metal), and a ring magnet. The cap is sized to fit over the reaction vessel access opening, and has an access port. The cap has an internal surface which faces the reaction vessel, and an external surface, which faces away from the reaction vessel. The ball is sized to fit over the cap access port, such that a portion of the ball seats partially in the cap access port on the cap internal surface, thus sealing the cap access port. According to an aspect of the invention, the ball may be comprised of a ferromagnetic material, or a magnetizable material that is preferably magnetized. The ring magnet produces a magnetic field, and is mounted to the cap on the cap external surface. The ring magnet is spaced from the cap such that the magnetic field is sufficient to hold the ball in the cap access port, and to reseat the ball in the cap access port after the reaction vessel is accessed.

18 Claims, 8 Drawing Sheets

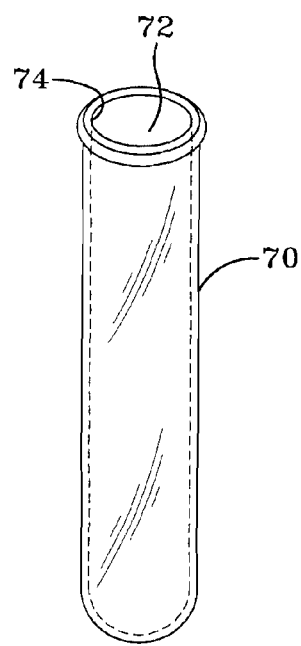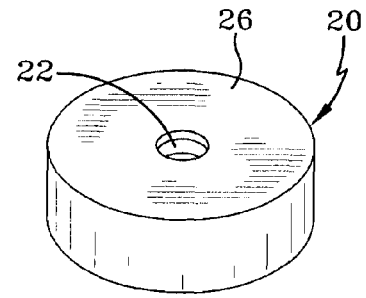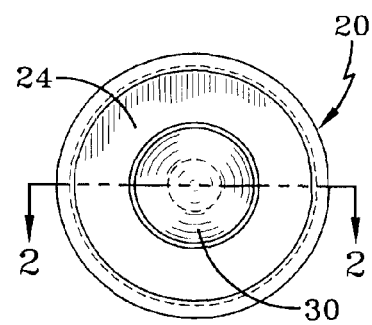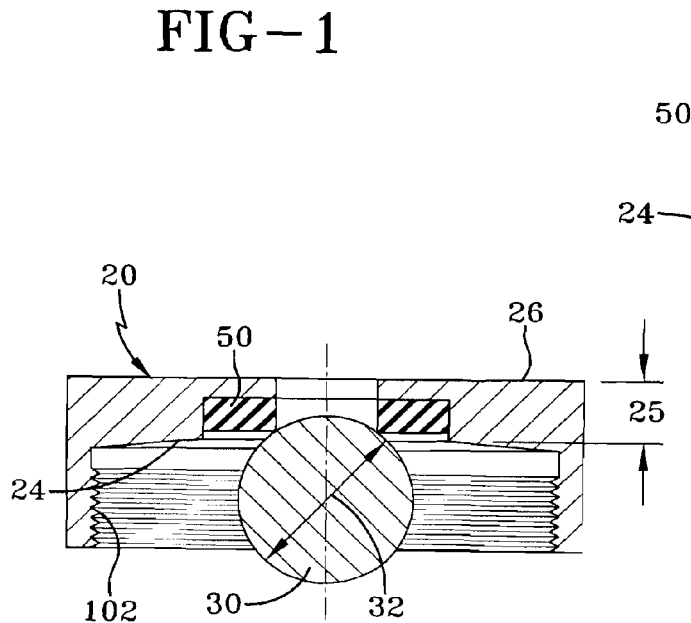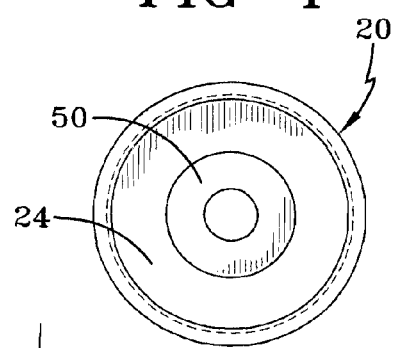

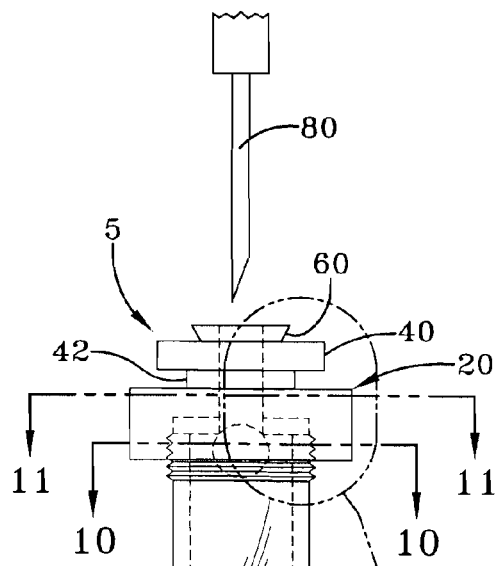
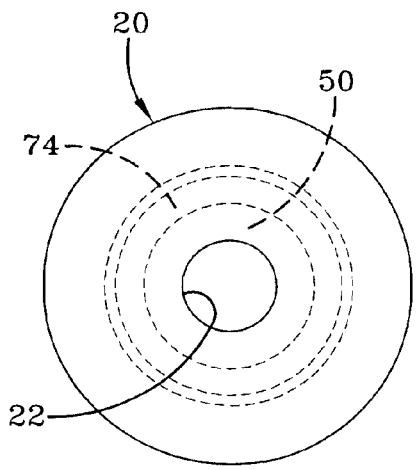
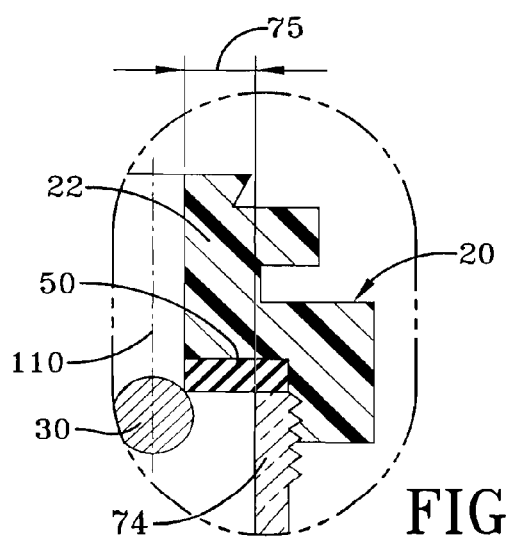
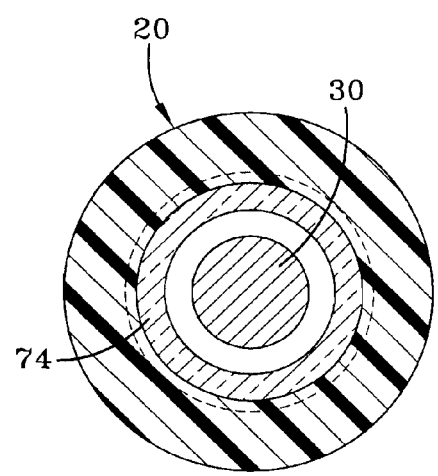
FIG-9
FIG-11
FIG-9A
FIG-10

SELF-SEALING APPARATUS FOR CHEMICAL REACTION VESSEL

This application is a continuation of U.S. patent application Ser. No. 10/899,995, filed on Jul. 27, 2004 (now pending in Art Unit 3751).

BACKGROUND OF THE INVENTION

The present invention is in the field of chemical reaction vessels. More specifically this invention relates to sealing of reaction vessels when adding or removing samples.

In general, addition of reagents to a reaction vessel is performed either by injection with a syringe and cannula through a septum, or by opening a port mechanically and adding the material through the opening. Another method is to use non-septum piercing disposable pipette tips which are thrust through prescored septa. This method is used when high accuracy and low cross contamination is desired, however, the essential prescored septum suffers from poor sealing properties.

In the case of addition through the septum, many problems routinely emerge. There are only a limited amount of times a septum can be pierced before it starts to leak at an unacceptable rate. Even one piercing may lead to a leak which could cause the loss of reagent and/or contamination, and change the outcome of an experiment in an unacceptable way. In the event that the tainted experimental result is not appreciated, false conclusions could be reached. One way the prior art has attempted to overcome this is by replacing the septum after use in a counterflow of inert gas. This is a time consuming and complex procedure. Further, septa are commonly abraded by the piercing action, resulting in septa particulates contaminating the experiment. Also, where the reaction vessel is subjected to conditions which produce a relatively high pressure in the vessel, this pressure commonly needs to vent to achieve accurate reagent delivery, and the way the septa commonly seals around the puncturing needle does not allow for adequate venting. In these situations, special grooved needles may be used, to allow for venting when the needles pierce the septa. However, these needles are more expensive, and contaminates may get caught in the grooves affecting the experiment.

Opening the port mechanically requires external actuation, which becomes challenging, complicated, and expensive with larger arrays of vessels. This is further complicated because any delay in closing the port allows reagents to potentially escape.

A sealing mechanism for reaction vessels is desired which would not deteriorate over time and use, which would not contaminate the reagents, which could allow for venting of pressure when necessary, which is self-actuating and self-sealing, and which would be easily adapted to large arrays of reaction vessels, such as those used in combinatorial chemistry.

SUMMARY OF THE INVENTION

According to an aspect of the invention, an apparatus for self-sealing of a reaction vessel, such that the reaction vessel may be repeatedly accessed by a fluid transfer mechanism and subsequently self-sealed, is detailed. The reaction vessel has an access opening, and the apparatus comprises a cap, a ball wherein the ball is comprised of a magnetizable material or is preferably magnetized, and a ring magnet. The cap is sized to fit over the reaction vessel access opening, and has an access port. The cap has an internal surface which faces the reaction vessel, and an external surface, which faces away from the reaction vessel. The ball is sized to fit over the cap access port, such that a portion of the ball seats partially in the cap access port on the cap internal surface, thus sealing the cap access port. According to an aspect of the invention, the ball may be comprised of a ferromagnetic material or a magnetizable material and may be magnetized. The ring magnet produces a magnetic field, and is mounted to the cap on the cap external surface. The ring magnet is spaced from the cap such that the magnetic field is sufficient to hold the ball in the cap access port, and to reseat the ball in the cap access port after the reaction vessel is accessed.

The present invention more specifically discloses an apparatus for self-sealing of a reaction vessel having an access opening, such that the reaction vessel may be repeatedly accessed by a fluid transfer mechanism, and subsequently self-sealed, comprising:

a cap sized to fit over the reaction vessel access opening, and having an access port therein, wherein said cap has an internal surface which faces the reaction vessel, and an external surface, which faces away from the reaction vessel;

a ball sized to fit over said cap access port, wherein the ball is comprised of a magnetizable material, such that a portion of said ball seats partially in said cap access port on said cap internal surface, sealing said cap access port; and a ring magnet which produces a magnetic field, wherein said ring magnet is mounted to said cap on said cap external surface, and spaced from said cap such that the magnetic field is sufficient to hold said ball in said cap access port, and to reseat said ball in said cap access port after said reaction vessel is accessed.

The present invention further discloses a method for sealing of a reaction vessel having an access opening, such that the vessel may be repeatedly accessed by a fluid transfer mechanism, and subsequently self-sealed, comprising:

sealing said access opening with a cap having an access port, wherein said cap has an internal surface which faces the reaction vessel, and an external surface, which faces away from the reaction vessel, wherein said cap internal surface is tapered from said access port outward toward the reaction vessel;

seating a dipolar magnetic ball in said access port, wherein said ball is sized to fit over said access port, such that a portion of said ball seats partially in said access port, sealing said access port;

mounting a ring magnet which produces a magnetic field to said cap external surface wherein said ring magnet is spaced from said cap such that the magnetic field is sufficient to hold said dipolar magnetic ball in said access port, and to reseat said dipolar magnetic ball in said access port after said reaction vessel is accessed.

The subject invention also reveals an apparatus for use in combinatorial chemistry for self-sealing of reaction vessels in an array such as a micro-titer plate, wherein the reaction vessels have an access opening, such that the reaction vessels may be repeatedly accessed by a fluid transfer mechanism, and subsequently self-sealed, comprising:

a cap sized to fit over the reaction vessel access opening, and having an access port therein, wherein said cap has an internal surface which faces the reaction vessel, and an external surface, which faces away from the reaction vessel;

a ball sized to fit over said cap access port, wherein the ball is comprised of a magnetizable material such that a portion of said ball seats partially in said cap access port on said cap internal surface, sealing said cap access port; and a ring magnet which produces a magnetic field, wherein said ring magnet is mounted to said cap on said cap external surface, and spaced from said cap such that the magnetic field is sufficient to hold said ball in said cap access port, and to reseat said ball in said cap access port after said reaction vessel is accessed.

BRIEF DESCRIPTION OF THE DRAWINGS

FIG. 1 is a front view of a reaction vessel according to an aspect of the invention.

FIG. 2 is a cross-sectional view of a portion of a self sealing apparatus, according to an aspect of the invention.

FIG. 3 is an isometric view of a cap according to an aspect of the invention.

FIG. 4 is a bottom view of a cap seating a ball according to an aspect of the invention.

FIG. 5 is a bottom view of a cap according to an aspect of the invention.

FIG. 9 is a side view of a reaction vessel self-sealing apparatus installed on a reaction vessel according to an aspect of the invention.

FIG. 9A is a close-up of a side view of a self-sealing reaction vessel as illustrated in FIG. 9.

FIG. 10 is a cross section from FIG. 9.

FIG. 11 is a cross section from FIG. 9.

DETAILED DESCRIPTION

Figure 18:
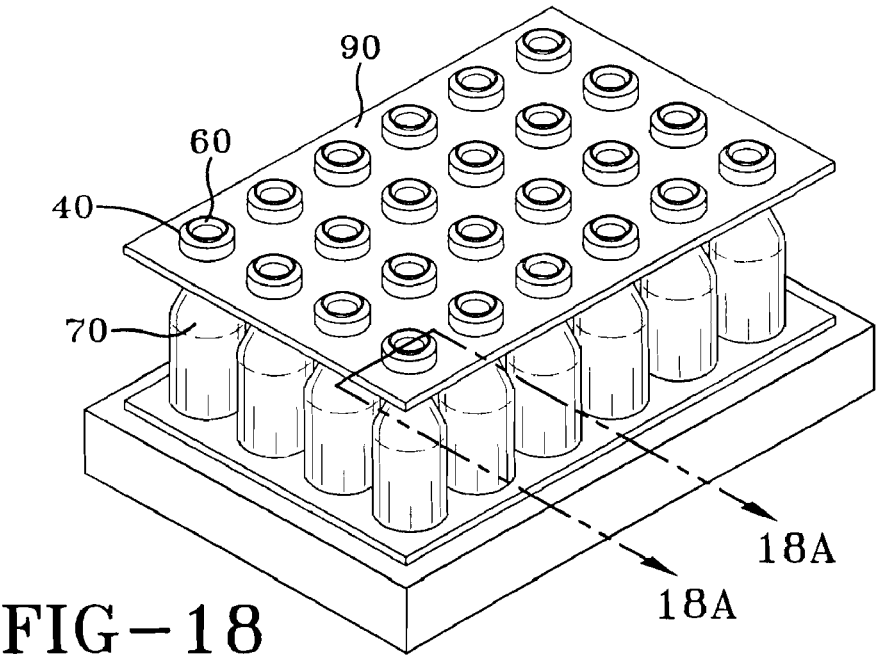
FIG. 18 is a prospective view an array of reaction vessels in a micro-titer device.
Figure 18A:
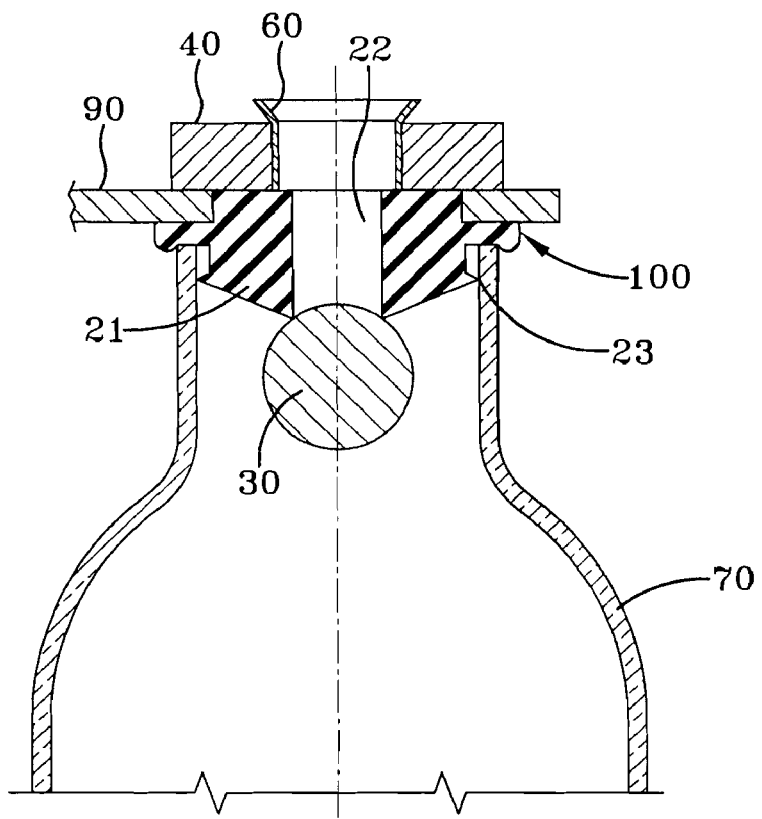
FIG. 18A is a cross section view of a self-sealing reaction vessel in the micro-titer device as illustrated in FIG. 18.
Figure 19:
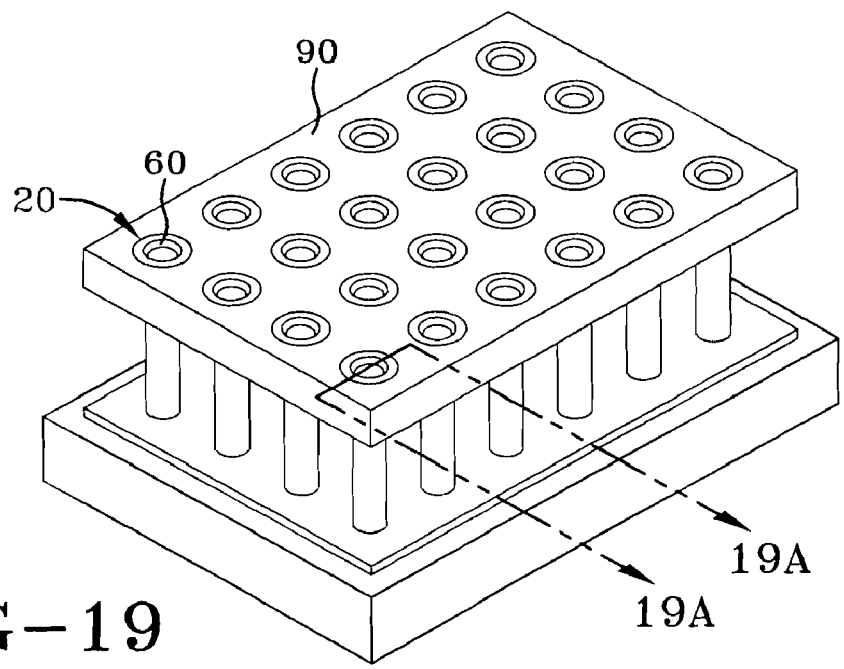
FIG. 19 is a prospective view of an array of reaction vessels in a micro-titer device in accordance with one aspect of this invention.
Figure 19A:
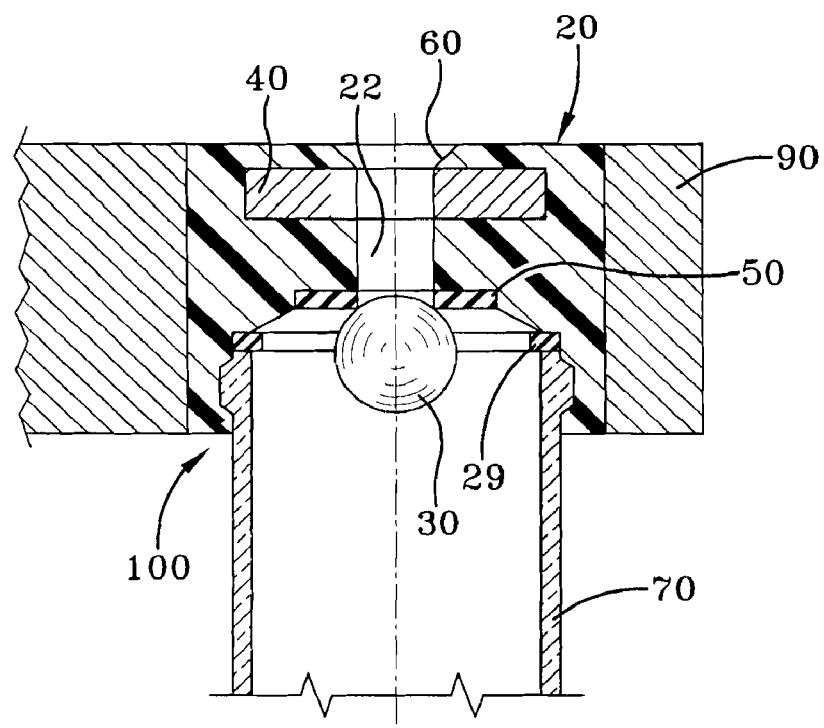
FIG. 19A is a cross section view of a self-sealing reaction in the micro-titer device as illustrated in FIG. 19.

Various aspects of the invention are presented in FIGS. 1-14 which are not drawn to scale and in which like components are numbered alike. Referring now to FIGS. 1-14, according to an aspect of the invention, an apparatus 5 for self-sealing of a reaction vessel 70, such that the reaction vessel 70 may be repeatedly accessed by a fluid transfer mechanism 80 and subsequently self-sealed, is shown. The reaction vessel 70 has an access opening 72, and the apparatus 5 comprises a cap 20, a fastening mechanism 100, a ball 30, and a ring magnet 40. A preferred embodiment of this invention is illustrated in FIG. 18A wherein the reaction vessel 70 is a Wheaton 3 mL glass autosampler vial, wherein the vessel is capped with a stopper 21 wherein the stopper is a Wheaton 13 mm snap-on stopper with a 3.5 mm center bore, wherein the ring magnet 40 has an outer diameter of 0.5 inches, an inner diameter of 0.28 inches and a thickness of 0.125 inches wherein the ring magnet is of grade N40, and is comprised of NdFeB, and wherein the ball 30 is a spherical magnet having a diameter of 0.186 inches, wherein the spherical magnet is of grade N40 and wherein the spherical magnet is comprised on NdFeB.

The cap 20 is sized to fit over the reaction vessel access opening 72, and has an access port 22. The cap 20 has an internal surface 24 which faces the reaction vessel 70, and an external surface 26, which faces away from the reaction vessel 70. The cap 20 may fit over the reaction vessel in a variety of ways. According to an aspect of the invention, the fastening mechanism 100 comprises a threaded portion 102 on the cap 20, and a mating threaded portion 104 on the reaction vessel 10. Thus the cap 20 may screw onto the reaction vessel 70. In a further aspect of the invention, the fastening mechanism 100 comprises a pressure fit between the cap 20 and the reaction vessel 10, such that the cap 20 may be snapped on to the reaction vessel 10. These are just two examples of fastening mechanisms, and in no way limits the invention to these methods, as any suitable method of fastening the cap 20 to the reaction vessel 70 is within the purview of this invention The ball 30 is sized to fit over the cap access port 22, such that a portion of the ball 30 seats partially in the cap access port 22 on the cap internal surface 24, thus sealing the cap access port 22. The ball is essentially spherical in shape. According to an aspect of the invention, the ball 30 may be comprised of a ferromagnetic material, or another magnetizable material and is preferably magnetized. The ball will typically be comprised of a material that can be permanently magnetized. Some representative examples of materials that can be used include metals and ceramics selected from aluminum-nickel-cobalt (alnicos), strontium-iron (ferrites, also known as ceramics), neodymium-iron-boron (neo magnets, sometimes referred to as "super magnets"), and samarium-cobalt. (The samarium-cobalt and neodymium-iron-boron families are collectively known as the rare earths.)

The ring magnet 40 produces a magnetic field, and is mounted to the cap 20 on the cap external surface 26. The ring magnet 40 is spaced from the cap 20 such that the magnetic field is sufficient to hold the ball 30 in the cap access port 22, and to reseat the ball 30 in the cap access port 22 after the reaction vessel 70 is accessed. This spacing can be accomplished for example, by using a spacing washer 42, or by the thickness of the cap 25.

According to a further aspect of the invention, the self-sealing apparatus 5 further comprises a sealing gasket 50 such as an O-ring, mounted to the cap 20 at the cap access port 22. The sealing gasket 50 is sized to ring the cap access port 22, such that the ball 30 will seat in the sealing gasket 50.

Figure 6:
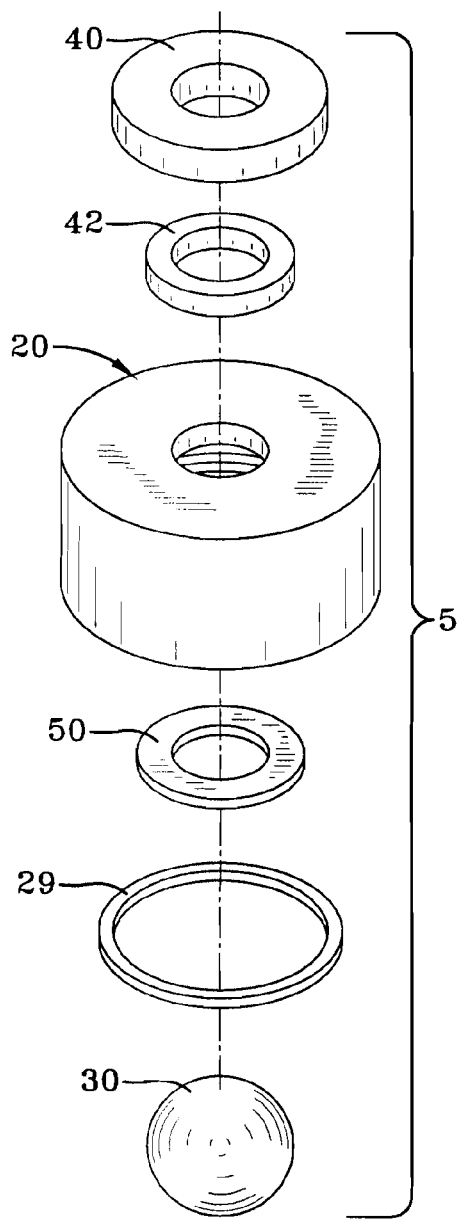
FIG. 6 is an exploded view of a reaction vessel self-sealing apparatus according to an aspect of the invention.
Figure 7:
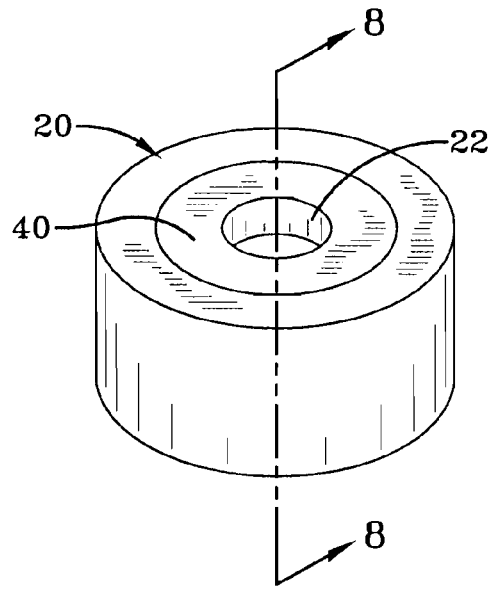
FIG. 7 is an isometric view of a cap according to an aspect of the invention.
Figure 8:
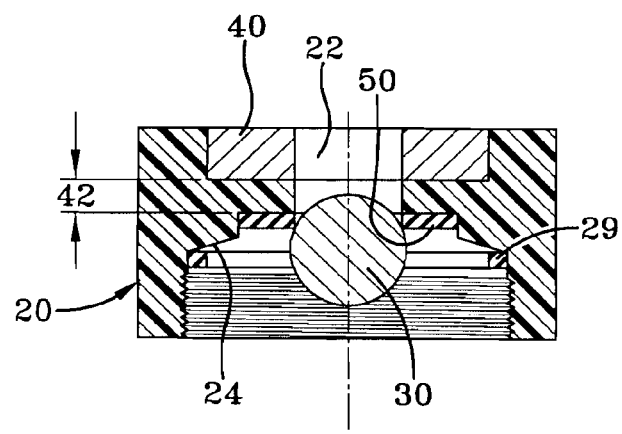
FIG. 8 is a cross section from FIG. 7.

In a preferred embodiment of the invention, the sealing gasket 50 is flush with the cap internal surface 24 (see FIGS. 2 and 8). In a further preferred embodiment, the sealing gasket 50 is comprised of an elastomeric material. In most cases, a sealing gasket 50 with chemically inert properties is desired, so as not to risk contamination of the reagents. For example, the sealing gasket 50 may be made of an elastomer which is coated with Telfon® polymer or made of a fluoronated elastomer, such as Tefzel® fluoronated elastomer. These are just examples which may be desirable, and in no way are intended to limit the sealing gasket 50 material, as any application suitable material may be used.

In order to further insure a good seal between the reaction vessel 70 and the cap 20, according to an aspect of the invention a cap gasket 29 is mounted to the cap internal surface 24 between the cap internal surface 24 and the reaction vessel walls 14.

According to another aspect of the invention, the ball 30 is magnetized. In a preferred embodiment, the ball 30 is a dipolar magnet. This allows for a stronger force between the ring magnet 40 and the ball 30, and therefore seats the ball 30 more securely in the sealing gasket 50.

To further improve the reseating of the ball 30 after the reaction vessel 70 is accessed, the cap internal surface 24 is conical in shape according to an aspect of the invention. In this configuration, the cap access port 22 is closest to the ring magnet 40, and as the cap internal surface 24 extends away from the cap access port 22, it gets farther away from the ring magnet 40.

To insure that the ball 30 does not prevent access by the fluid transfer mechanism 80, or cause damage or bending of the fluid transfer mechanism, according to an aspect of the invention the dimensions of the ball 30 relative to the dimensions of the reaction vessel walls and the cap access port 22 are controlled. The cap 20 is mounted to the reaction vessel walls 74, wherein there is a distance 75 between the center line 110 of the access port 20 and the reaction vessel walls 74. The ball 30 has a diameter 32 which is less than the distance 75 between the center line 110 of the access port 20 and the reaction vessel walls 74. To further insure that the ball 30 does not prevent access by the fluid transfer mechanism, or cause damage or bending of the fluid transfer mechanism, according to an aspect of the invention, the distance 75 should be greater than the diameter of the ball 30 plus the radius of the fluid transfer mechanism 80.

Another method of insuring that the ball 30 does not prevent access by the fluid transfer mechanism 80 is by using a reaction vessel which has a neck portion 76 and a body portion 78 wherein the distance 75 in the neck portion may be smaller than the diameter of the ball 30, but in the body portion 78 the distance 75 is greater than the ball diameter 32. In this configuration, the neck portion 76 is shorter than the reach of the fluid transfer mechanism 80. Thus the fluid transfer mechanism 80 may push the ball 30 down through the neck portion 76 until it reaches the body portion 78 where it rolls out of the way of the fluid transfer mechanism 80. The neck portion 76 must be short enough such that the magnetic field is strong enough to return the ball 30 to its seated position from the body portion 78. An example of an appropriate shaped reaction vessel 70 is what is commonly called a serum vial. In a preferred embodiment of the invention, the ring magnet 40 is integral to the cap 20 (see FIGS. 7 and 8).

Figure 15:
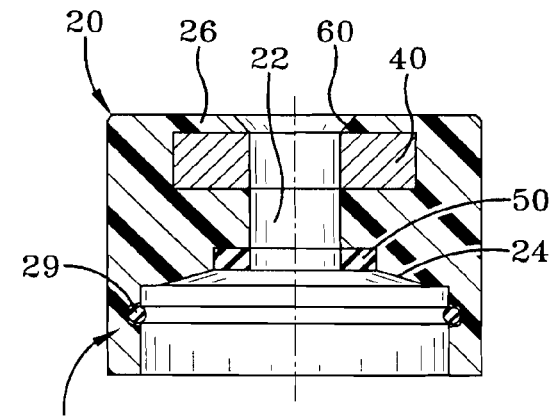
FIG. 15 is a cross section from FIG. 14.
Figure 16:
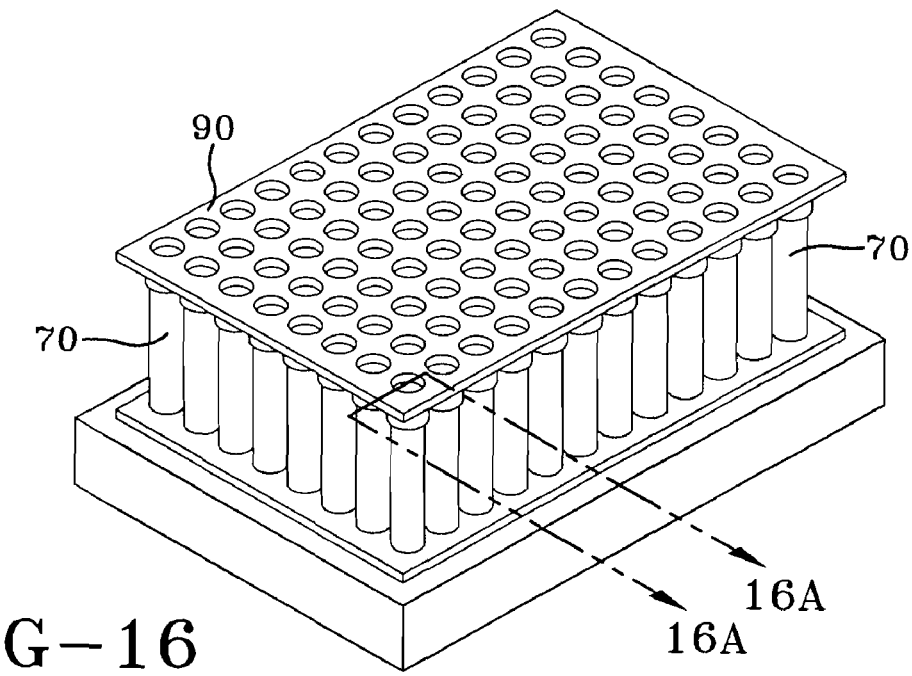
FIG. 16 is an isometric view of part of an array of reaction vessels in a micro-titer type device.
Figure 16A:
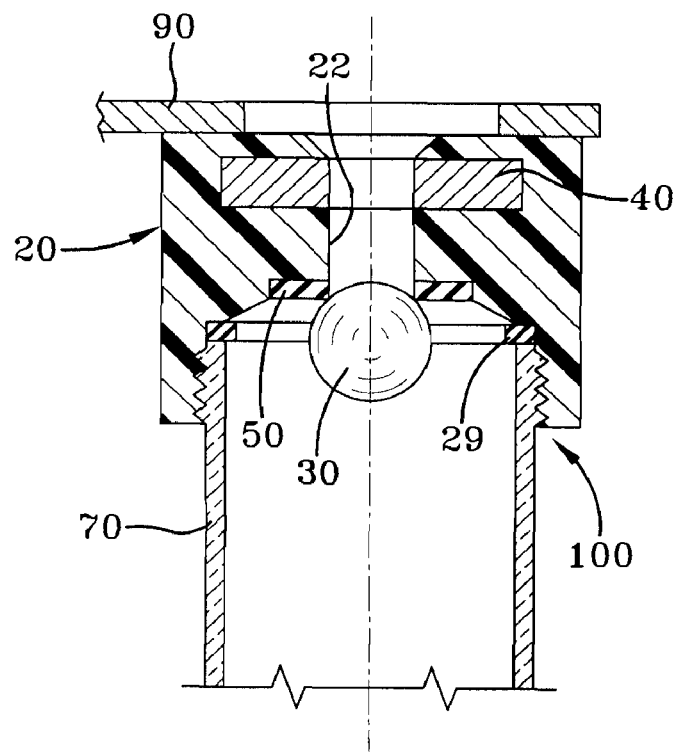
FIG. 16A is a cross section of a self-sealing apparatus of one aspect of this invention mounted on the upper portion of a reaction vessel.
Figures 17, 17A:
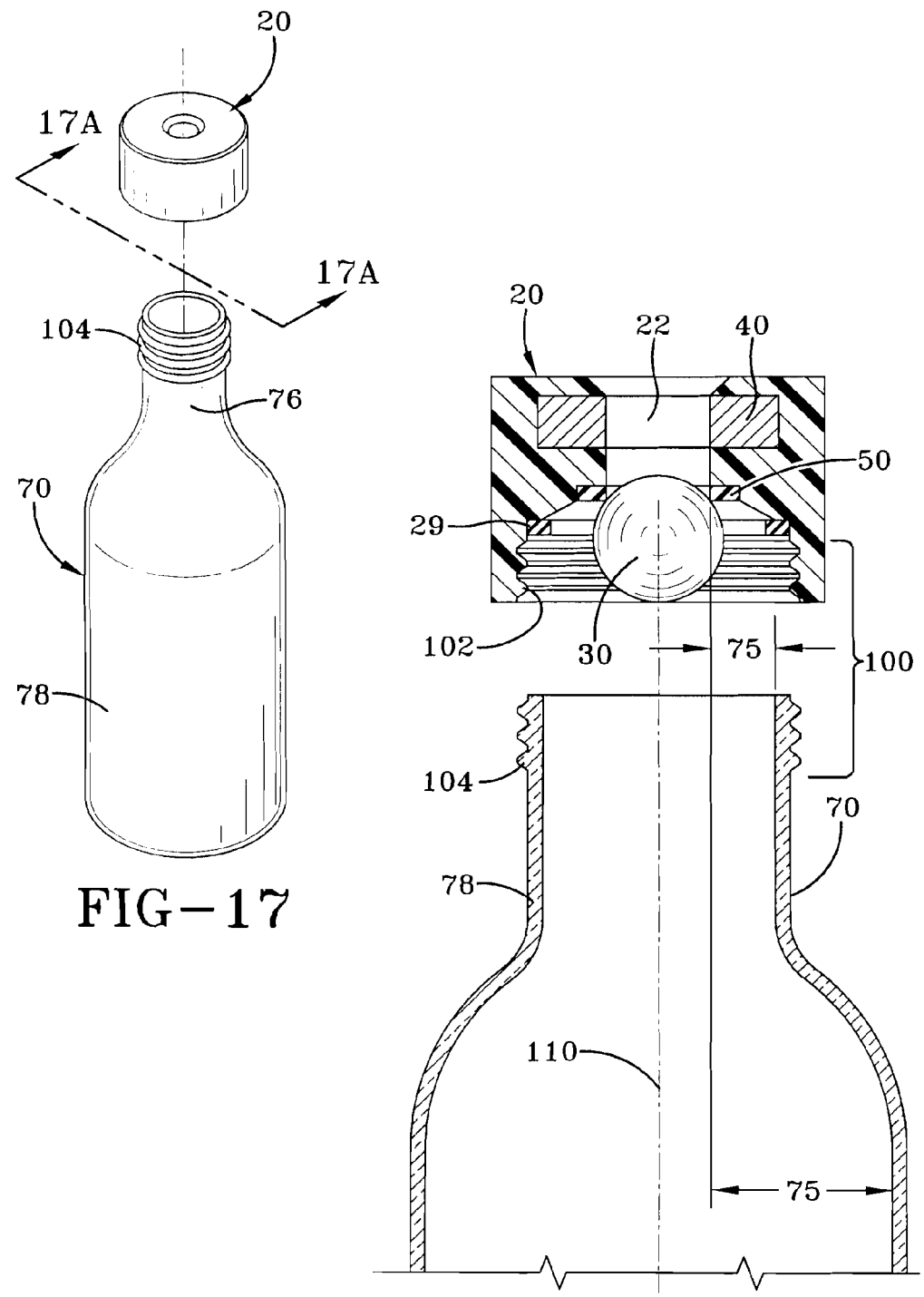
FIG. 17 is a side view of a self-sealing reaction vessel having a neck portion and a body with a cap therefore shown in an exploded orientation.
FIG. 17A is a cross section of the upper portion of the self-sealing reaction vessel illustrated in FIG. 17.

These types of reaction vessels are often accessed by a machine, which does not aim for a specific part of the access opening 72, but rather a specific point in space where the access opening 72 is supposed to be. Therefore the accuracy is limited by human error in positioning the reaction vessels 70, and positioning of the fluid transfer mechanism 80, such as a cannula, in the machine. To allow for proper functioning with some error in these areas, according to a further aspect of the invention, the apparatus 5 further comprises a guiding mechanism 60 mounted to the cap external surface 26 for guiding the fluid transfer mechanism 80 into the access port 22 (see FIG. 9). In a preferred embodiment the guiding mechanism 60 is a funnel shape. This can be done with an external funnel apparatus, or, where the ring magnet 40 is integral to the cap 20, the guiding mechanism 60 could comprise the cap external surface 26 being tapered at the access port 22 (see FIGS. 14 and 15). This is especially useful when large arrays of reaction vessels, such as when they are arranged in a micro-titer format, are being accessed simultaneously, such as is commonly done in combinatorial chemistry (see FIG. 16). One typical micro-titer format is a 96 block, with rows 8×12.

The self-sealing apparatus may be used in a micro-titer format. In such a format, the cap 20 may be on the reaction vessel 10 before installation into this format, or the cap 20 may be located in the top micro-titer plate 90. According to this aspect of the invention, the cap 20 is mounted to the reaction vessel 70 by the clamping of the top micro-titer plate 90 onto the block of reaction vessels, and this acts as the fastening mechanism. The self-sealing apparatus of this invention can be used in conjunction with virtually any vessel for storing, mixing, and/or reacting chemical agents. Such chemical reaction vessels are most suitable for storing, mixing and/or reacting liquid chemical agents and solid chemical agents that are dissolved or otherwise dispersed in a liquid. However, the chemical reaction vessel can optionally be used in conjunction with chemicals that are in the solid or gas phase. For instance, reaction vessels that are equipped with the self-sealing apparatus of this invention are particularly useful in cases where a liquid medium is sparged with a gas.

Figure 12:
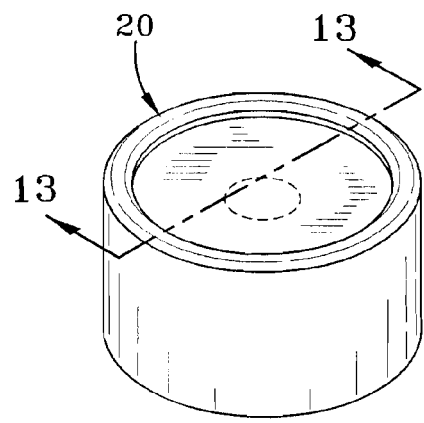
FIG. 12 is a top view of a cap according to an aspect of the invention
Figure 13:
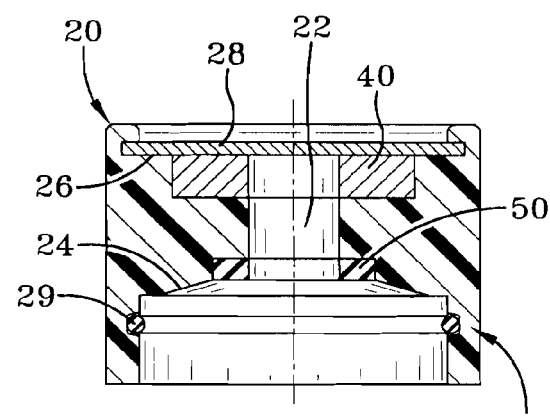
FIG. 13 is a cross section from FIG. 12.
Figure 14:
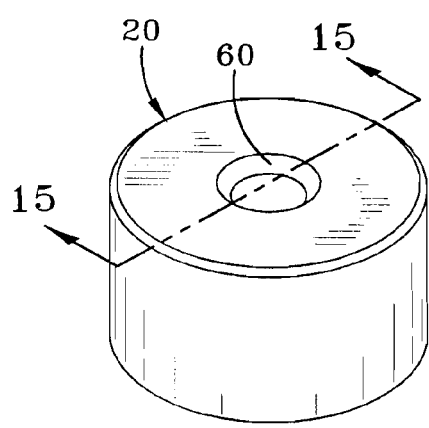
FIG. 14 is an isometric view of a cap according to an aspect of the invention

To further isolate the reactants in the reaction vessel 70, according to an aspect of the invention, the self-sealing apparatus 5 further comprises a septum 28 mounted to the cap external surface 26 (see FIGS. 12 and 13). This is useful where it is important that no gas escape the reaction vessel 70. Combining the septum with the self-sealing apparatus insures a positive seal even after piercing the septum, whereas the septum alone may leak after initial or repeated piercings adversely affecting the reaction.

According to a further aspect of the invention, the cap 20 may be comprised of an elastomeric material. This elastomeric material should be chemically inert for best results. In a preferred embodiment, the elastomeric cap external surface is planar, and the elastomeric cap internal surface comprises a protrusion into the reaction vessel, wherein the protrusion makes a ring of contact with the reaction vessel walls. This ring of contact helps improve the seal between the cap and the reaction vessel. A standard serum vial septum may be used as the cap portion in this embodiment. This standard septum will have to be modified to have a cap access port. In this embodiment, one method of mounting the ring magnet would be to mount the ring magnet to an external plate, such as a micro-titer plate 90. Thus when the reaction vessel is mounted in the micro-titer format with this micro-titer plate 90, the ring magnet will be in proper spatial relation to the ball.

What is claimed is:

1. A self-sealing reaction vessel having an access opening, such that the reaction vessel may be repeatedly accessed by a fluid transfer mechanism, and subsequently self-sealed, comprising:

a cap sized to fit over the reaction vessel access opening, said cap having an access port located above said reaction vessel access opening when said cap is attached to said reaction vessel, wherein said cap has an internal surface which faces the reaction vessel, and an external surface, which faces away from the reaction vessel, wherein the reaction vessel is a serum vial having a neck portion and a body portion, wherein the body portion of the reaction vessel has a greater diameter than the neck portion of the reaction vessel, wherein the reaction vessel is further comprised of a septum which is mounted to the cap external surface, and wherein the septum covers the access port;

a fastening mechanism for fastening said cap to the reaction vessel, wherein said fastening mechanism comprises a threaded portion formed on said internal surface of said cap and a mating threaded portion formed on an external surface of said reaction vessel adjacent said reaction vessel access opening;

a ball sized to fit over said cap access port, wherein the ball is comprised of a magnetizable material such that a portion of said ball seats partially in said cap access port on said cap internal surface, sealing said cap access port; and a ring magnet which produces a magnetic field, wherein said ring magnet is mounted to said cap on said cap external surface, and spaced from said cap such that the magnetic field is sufficient to hold said ball in said cap access port such as said ball does not directly contact said ring magnet, and to reseat said ball in said cap access port after said reaction vessel is accessed.

2. The self-sealing reaction vessel of claim 1 further comprising a sealing gasket mounted to said cap at said access port, wherein said sealing gasket is sized to ring said access port, such that said ball will seat in said sealing gasket.

3. The self-sealing reaction vessel of claim 2 wherein said sealing gasket is flush with said cap internal surface.

4. The self-sealing reaction vessel of claim 2 wherein said sealing gasket is comprised of an elastomeric material.

5. The self-sealing reaction vessel of claim 1 wherein said ball is magnetized.

6. The self-sealing reaction vessel of claim 1 wherein said ball is a dipolar magnet.

7. The self-sealing reaction vessel of claim 1 wherein said cap internal surface is conical in shape wherein said cap access port is closest to said ring magnet.

8. The self-sealing reaction vessel of claim 1 wherein the reaction vessel has walls, wherein the access port has a center line, wherein said cap is mounted to the reaction vessel walls, wherein there is a distance between said access port and the reaction vessel walls, and wherein said ball has a diameter which is less than the distance between the center line of said access port and the reaction vessel walls.

9. The self-sealing reaction vessel of claim 5 wherein the ball is comprised of an aluminum-nickel-cobalt alloy.

10. The self-sealing reaction vessel of claim 5 wherein the ball is comprised of a strontium-iron alloy.

11. The self-sealing reaction vessel of claim 5 wherein the ball is comprised of a neodymium-iron-boron alloy.

12. The self-sealing reaction vessel of claim 5 wherein the ball is comprised of a samarium-cobalt alloy.

13. An array of a plurality of self-sealing reaction vessels wherein the self-cleaning reaction vessels are as specified in claim 1 and wherein the array of self-sealing reaction vessels are mounted in a micro-titer format.

14. The array of self-sealing reaction vessel as specified in claim 9 wherein the micro-titer format is a 96 block micro-titer format.

15. The self-sealing reaction vessel of claim 10 wherein the self-sealing reaction vessels are arranged in 8 rows of 12 self-sealing reaction vessels.

16. A self-sealing reaction vessel having an access opening, such that the reaction vessel may be repeatedly accessed by a fluid transfer mechanism, and subsequently self-sealed, comprising:

a cap sized to fit over the reaction vessel access opening, said cap having an access port located above said reaction vessel access opening when said cap is attached to said reaction vessel, wherein said cap has an internal surface which faces the reaction vessel, and an external surface, which faces away from the reaction vessel, wherein the reaction vessel is mounted in a micro-titer format, wherein the reaction vessel is a serum vial having a neck portion and a body portion, wherein the body portion of the reaction vessel has a greater diameter than the neck portion of the reaction vessel, wherein the reaction vessel is further comprised of a septum which is mounted to the cap external surface, and wherein the septum covers the access port;

a fastening mechanism for fastening said cap to the reaction vessel, wherein said fastening mechanism comprises a threaded portion formed on said internal surface of said cap and a mating threaded portion formed on an external surface of said reaction vessel adjacent said reaction vessel access opening;

a ball sized to fit over said cap access port, wherein the ball is comprised of a magnetizable material such that a portion of said ball seats partially in said cap access port on said cap internal surface, sealing said cap access port; and a ring magnet which produces a magnetic field, wherein said ring magnet is mounted to said cap on said cap external surface, and spaced from said cap such that the magnetic field is sufficient to hold said ball in said cap access port such as said ball does not directly contact said ring magnet, and to reseat said ball in said cap access port after said reaction vessel is accessed.

17. The self-sealing reaction vessel of claim 16 wherein said ball is magnetized.

18. The self-cleaning reaction vessel of claim 16 wherein the micro-titer format is a 96 block micro-titer format.

* * * * *